(12) United States Patent
Anders et al.

(10) Patent No.: US 11,660,697 B2
(45) Date of Patent: May 30, 2023

(54) BALANCED PLATE RECTIFIERS AND WELDING-TYPE POWER SUPPLIES INCLUDING BALANCED PLATE RECTIFIERS

(71) Applicant: Illinois Tool Works Inc., Glenview, IL (US)

(72) Inventors: Adam E. Anders, Oshkosh, WI (US); Brian Schwartz, Appleton, WI (US); Paul William Garvey, Freedom, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 644 days.

(21) Appl. No.: 16/707,717

(22) Filed: Dec. 9, 2019

(65) Prior Publication Data

US 2020/0180061 A1  Jun. 11, 2020

Related U.S. Application Data

(60) Provisional application No. 62/778,203, filed on Dec. 11, 2018.

(51) Int. Cl.
*B23K 9/10* (2006.01)
*H01F 27/29* (2006.01)
*H02M 7/06* (2006.01)

(52) U.S. Cl.
CPC .......... *B23K 9/1043* (2013.01); *H01F 27/29* (2013.01); *H02M 7/06* (2013.01)

(58) Field of Classification Search
CPC ......... B23K 9/1043; H01F 27/29; H02M 7/06
See application file for complete search history.

(56) References Cited

U.S. PATENT DOCUMENTS

| | | |
|---|---|---|
| 3,193,754 A | 7/1965 | Dortort |
| 3,223,901 A | 12/1965 | Riley |
| 3,361,951 A | 1/1968 | Thorne |
| 3,370,216 A | 2/1968 | Bowar |
| 3,842,336 A | 10/1974 | Galloway |
| 4,184,199 A | 1/1980 | Bardahl |
| 8,530,789 B2 * | 9/2013 | Diekmann ........... B23K 9/1006 361/695 |

FOREIGN PATENT DOCUMENTS

WO      2012089751 A1     7/2012

* cited by examiner

*Primary Examiner* — Carlos Amaya
(74) *Attorney, Agent, or Firm* — McAndrews, Held & Malloy, Ltd.

(57) ABSTRACT

A welding-type power supply including a balanced plate rectifier to rectify high frequency alternating current from one or more transformers. The balanced plate rectifier includes an output terminal symmetrically connected to the plates of the plate rectifiers. The impedance between the output terminal and each plate is substantially equal.

20 Claims, 8 Drawing Sheets

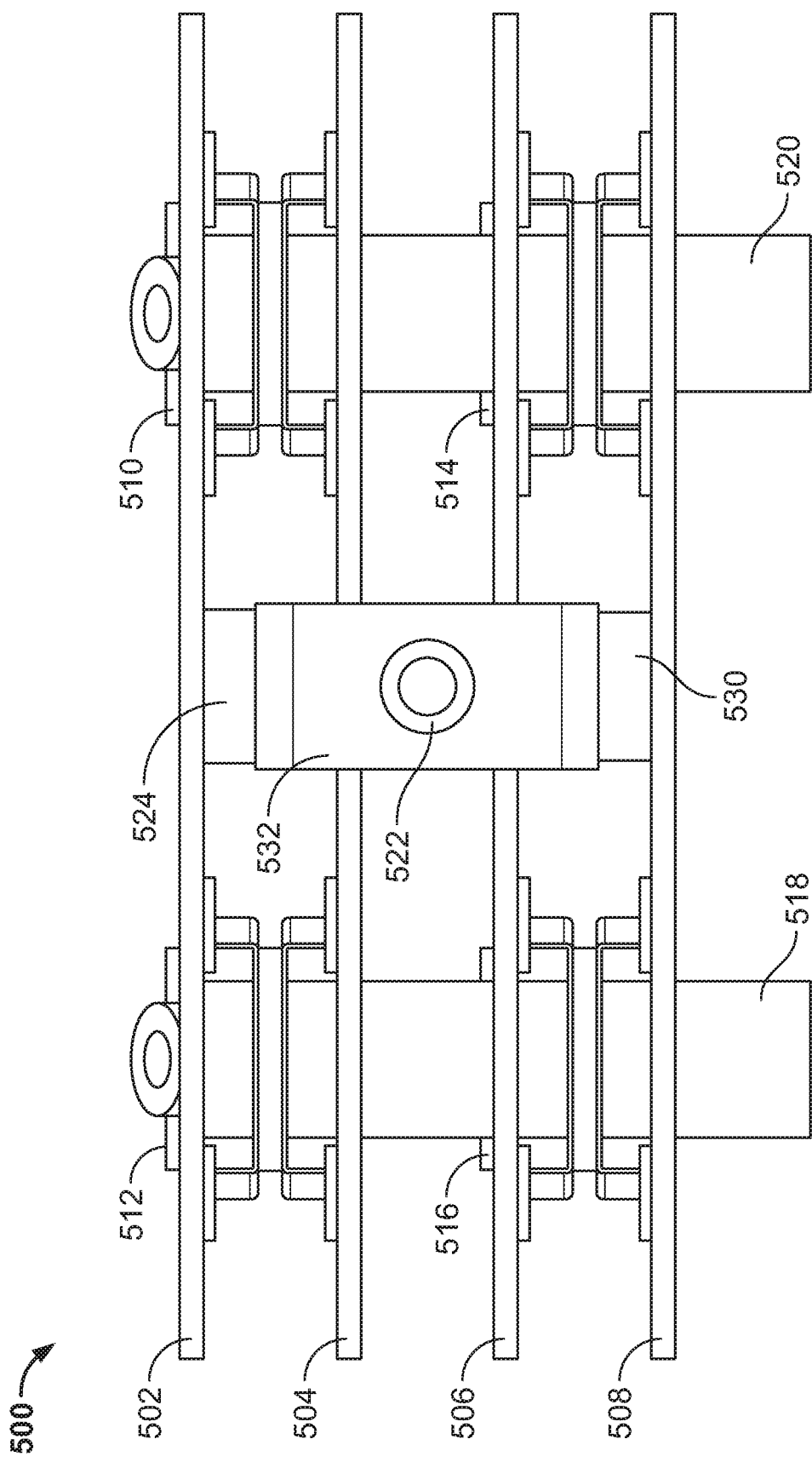

US 11,660,697 B2

BALANCED PLATE RECTIFIERS AND WELDING-TYPE POWER SUPPLIES INCLUDING BALANCED PLATE RECTIFIERS

CROSS REFERENCE TO RELATED APPLICATIONS

The present application claims the benefit of U.S. Provisional Patent Application Ser. No. 62/778,203 filed Dec. 11, 2018, entitled "BALANCED PLATE RECTIFIERS AND WELDING-TYPE POWER SUPPLIES INCLUDING BALANCED PLATE RECTIFIERS." The entire contents of U.S. Provisional Patent Application Ser. No. 62/778,203 are expressly incorporated herein by reference.

TECHNICAL FIELD

This disclosure relates generally to power electronics and, more particularly, to balanced plate rectifiers and welding-type power supplies including balanced plate rectifiers.

BACKGROUND

Welding-type components (e.g., welding torches) are sometimes powered by welding-type power supplies. Conventional power supplies use a range of electrical components and/or electrical circuitry to produce appropriate welding-type power for various welding-type operations and/or welding-type components. Some conventional welding-type power supplies used switched-mode power supplies to convert AC input power to AC and/or DC welding-type power.

SUMMARY

The present disclosure is directed to balanced plate rectifiers and welding-type power supplies including balanced plate rectifiers, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

BRIEF DESCRIPTION OF THE DRAWINGS

FIG. 8 is another elevation view of the balanced plate rectifier of FIG. 5.

The figures are not to scale. Where appropriate, the same or similar reference numerals are used in the figures to refer to similar or identical elements.

DETAILED DESCRIPTION

Figure 1:
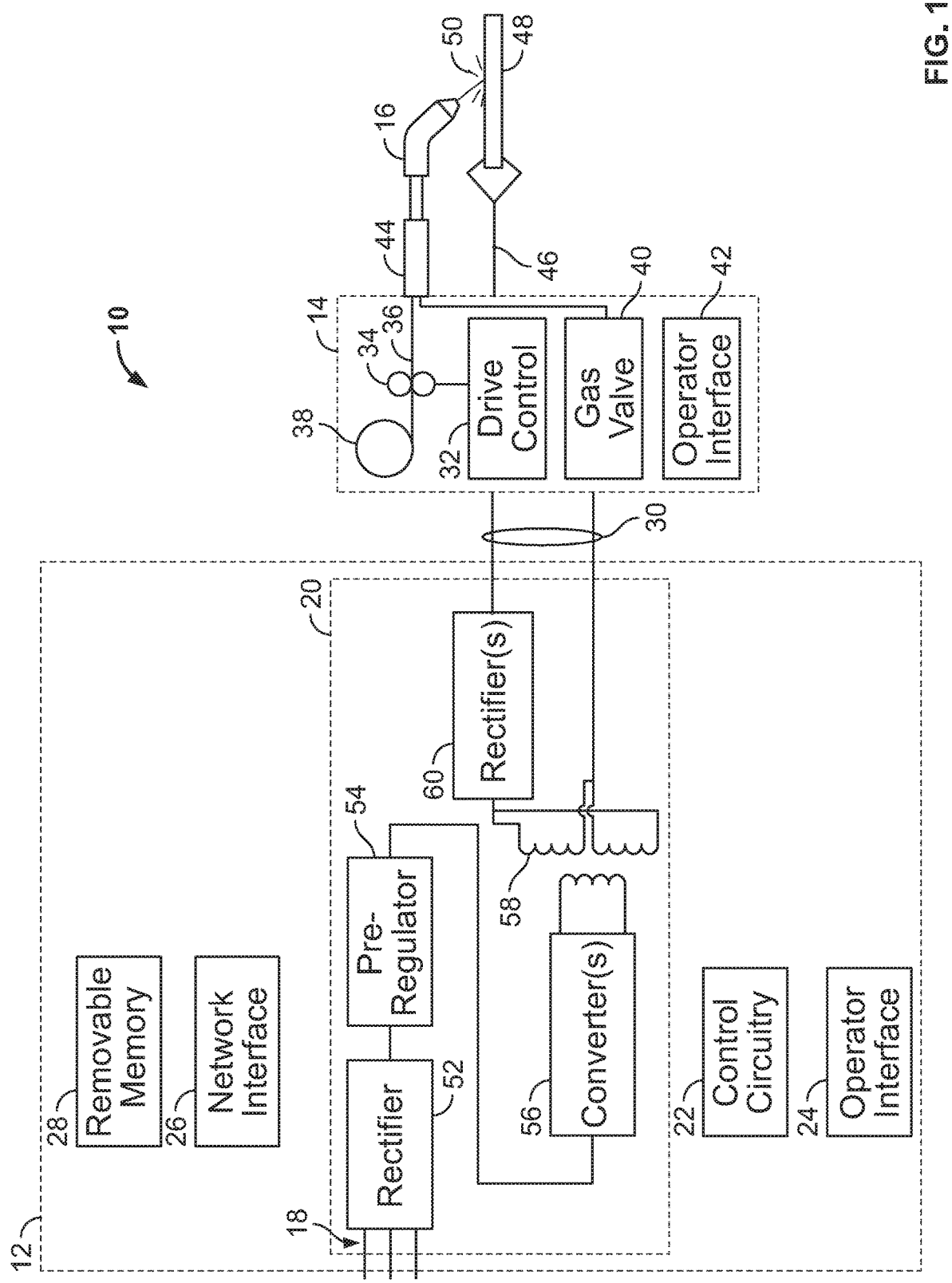
FIG. 1 is a diagram of an example welding-type system in accordance with aspects of this disclosure.

Disclosed example apparatus provide improved electrical connections to high-frequency plate rectifiers, to improve current balancing by balancing impedances in parallel current paths. Conventional plate rectifiers do not adequately balance impedances for high-frequency loads, which causes portions of the plate rectifiers to experience heavier loads than other portions of the plate rectifiers. For example, conventional plate rectifiers may experience parasitic inductances which, when applied to high-frequency loads, can result in substantial imbalances in impedance. Conventional, imbalanced plate rectifiers provide paths through multiple sets of diodes that cause the paths through some plates and diodes of the conventional plate rectifier to experience additional inductance compared to others of the plates. The imbalance in impedance leads to a current sharing imbalance between the diodes at switching events, which causes increased losses, increased heat generation, uneven temperature rise in the diodes, and/or reduced lifespan of the plate rectifier. Because the limiting factor in the operation of the rectifier is the highest-temperature diode, a temperature imbalance causes some diodes to run warmer than if all of the diodes were sharing current equally, and thereby reduces the effective rating of the entire rectifier assembly.

In contrast, disclosed example plate rectifiers are configured to balance impedances, including parasitic inductances, between the terminals of high-frequency source currents (e.g., transformer secondary windings), through each of the plate rectifier diodes, and to the output terminal.

As used herein, the terms "balanced" and "symmetric" both refer to having substantially identical impedances. For example, if two or more current paths are balanced or symmetric, then those two or more current paths each have substantially identical impedances. In some examples, having substantially identical impedances may include having similar or identical geometries and/or similar or identical materials.

Disclosed example welding-type power supplies include power conversion circuitry configured to convert input power to welding-type power, the power conversion circuitry including: a first transformer configured to output first alternating current (AC) power; a second transformer configured to output second alternating current (AC) power; and a rectifier configured to convert the first AC power and the second AC power to direct current (DC) output power, the rectifier including a first plate rectifier connected to a first output lead of the first transformer and a second output lead of the first transformer; a second plate rectifier connected to the first output lead and the second output lead; a third plate rectifier connected to a third output lead of the second transformer and a fourth output lead of the second transformer; a fourth plate rectifier connected to the third output lead of the second transformer and the fourth output lead of the second transformer; and a first output terminal symmetrically connected to the first plate rectifier, the second plate rectifier, the third plate rectifier, and the fourth plate rectifier.

In some example welding-type power supplies, the first output terminal is connected to: a first electrical conductor connecting the first plate rectifier to the second plate rectifier; and a second electrical conductor connecting the third plate rectifier to the fourth plate rectifier.

In some example welding-type power supplies, each of the first plate rectifier, the second plate rectifier, the third plate rectifier, and the fourth plate rectifier includes a conductive plate, and the first electrical conductor is connected to the conductive plates of the first plate rectifier and the second plate rectifier, and the second electrical conductor is connected to the conductive plates of the third plate rectifier and the fourth plate rectifier.

In some example welding-type power supplies, each of the first plate rectifier, the second plate rectifier, the third plate rectifier, and the fourth plate rectifier includes a pair of diodes, each of the diodes having: an anode connected to the respective first output lead, second output lead, third output lead, or fourth output lead; and a cathode connected to the respective conductive plate.

In some example welding-type power supplies, each of the conductive plates are aluminum alloy plates.

In some example welding-type power supplies, the power conversion circuitry further comprises a second output terminal connected to a first center tap lead of the first transformer and a second center tap lead of the second transformer.

In some example welding-type power supplies, the power conversion circuitry is configured to provide direct current welding-type power between the first output terminal and the second output terminal. In some example welding-type power supplies, the first output terminal has a positive polarity.

In some example welding-type power supplies, the first output lead and the second output lead are symmetrically connected to the first plate rectifier and the second plate rectifier, and the third output lead and the fourth output lead are symmetrically connected to the third plate rectifier and the fourth plate rectifier.

Disclosed welding-type power supplies include power conversion circuitry configured to convert input power to welding-type power, the power conversion circuitry including: a first transformer having a first output lead and a second output lead, the first transformer configured to output first alternating current (AC) power; a second transformer having a third output lead and a fourth output lead, the second transformer configured to output second alternating current (AC) power; and a rectifier configured to convert the first AC power and the second AC power to direct current (DC) output power, the rectifier including: a first plate rectifier connected to the first output lead of the first transformer and the third output lead of the second transformer; a second plate rectifier connected to the first output lead and the third output lead; a third plate rectifier connected to the second output lead of the first transformer and the fourth output lead of the second transformer; a fourth plate rectifier connected to the second output lead of the first transformer and the fourth output lead of the second transformer; and a first output terminal symmetrically connected to the first plate rectifier, the second plate rectifier, the third plate rectifier, and the fourth plate rectifier.

Disclosed welding-type power supplies include power conversion circuitry configured to convert input power to welding-type power, the power conversion circuitry including: a first transformer configured to output first alternating current (AC) power; and a rectifier configured to convert the first AC power and the second AC power to direct current (DC) output power, the rectifier including: a first plate rectifier connected to a first output lead of the first transformer and a second output lead of the first transformer; a second plate rectifier connected to the first output lead and the second output lead; a third plate rectifier connected to the first output lead and the second output lead; a fourth plate rectifier connected to the first output lead and the second output lead; and a first output terminal symmetrically connected to the first plate rectifier, the second plate rectifier, the third plate rectifier, and the fourth plate rectifier.

In some example welding-type power supplies, the first plate rectifier, the second plate rectifier, the third plate rectifier, and the fourth plate rectifier are symmetrically connected to the first output lead and the second output lead.

Disclosed welding-type power supplies include: power conversion circuitry configured to convert input power to welding-type power, the power conversion circuitry including: a first transformer having a first output lead and a second output lead; a second transformer having a third output lead and a fourth output lead; a first plate rectifier including: a first conductive plate; a first diode having a first anode connected to the first output lead and a first cathode connected to the first conductive plate; and a second diode having a second anode connected to the second output lead and a second cathode connected to the first conductive plate; a second plate rectifier including: a second conductive plate; a third diode having a third anode connected to the first output lead and a third cathode connected to the second conductive plate; and a fourth diode having a fourth anode connected to the second output lead and a fourth cathode connected to the second conductive plate; a third plate rectifier including: a third conductive plate; a fifth diode having a fifth anode connected to the third output lead and a fifth cathode connected to the third conductive plate; and a sixth diode having a sixth anode connected to the fourth output lead and a sixth cathode connected to the third conductive plate; a fourth plate rectifier including: a fourth conductive plate; a seventh diode having a seventh anode connected to the third output lead and a seventh cathode connected to the fourth conductive plate; and an eighth diode having an eighth anode connected to the fourth output lead and an eighth cathode connected to the fourth conductive plate; and a first output terminal symmetrically connected to the first conductive plate, the second conductive plate, the third conductive plate, and the fourth conductive plate.

Disclosed welding-type power supplies include: power conversion circuitry configured to convert input power to welding-type power, the power conversion circuitry comprising: a first transformer having a first output lead and a second output lead; a second transformer having a third output lead and a fourth output lead; a first plate rectifier comprising: a first conductive plate; a first diode having a first anode connected to the first output lead and a first cathode connected to the first conductive plate; and a second diode having a second anode connected to the third output lead and a second cathode connected to the first conductive plate; a second plate rectifier comprising: a second conductive plate; a third diode having a third anode connected to the first output lead and a third cathode connected to the second conductive plate; and a fourth diode having a fourth anode connected to the third output lead and a fourth cathode connected to the second conductive plate; a third plate rectifier comprising: a third conductive plate; a fifth diode having a fifth anode connected to the second output lead and a fifth cathode connected to the third conductive plate; and a sixth diode having a sixth anode connected to the fourth output lead and a sixth cathode connected to the third conductive plate; a fourth plate rectifier comprising: a fourth conductive plate; a seventh diode having a seventh anode connected to the second output lead and a seventh cathode connected to the fourth conductive plate; and an eighth diode having an eighth anode connected to the fourth output lead and an eighth cathode connected to the fourth conductive plate; and a first output terminal symmetrically connected to the first conductive plate, the second conductive plate, the third conductive plate, and the fourth conductive plate.

Disclosed welding-type output rectifiers include a first plate rectifier configured to connect to a first output lead of a first transformer and a second output lead of the first transformer; a second plate rectifier configured to connect to the first output lead and the second output lead; a third plate rectifier configured to connected to a third output lead of a second transformer and a fourth output lead of the second transformer; a fourth plate rectifier configured to connect to the third output lead of the second transformer and the fourth output lead of the second transformer; a first output terminal symmetrically connected to the first plate rectifier, the second plate rectifier, the third plate rectifier, and the fourth plate rectifier.

Disclosed welding-type output rectifiers include a first plate rectifier configured to connect to a first output lead of a first transformer and a second output lead of a second transformer; a second plate rectifier configured to connect to the first output lead and the second output lead; a third plate rectifier configured to connected to a third output lead of the first transformer and a fourth output lead of the second transformer; a fourth plate rectifier configured to connect to the third output lead of the first transformer and the fourth output lead of the second transformer; a first output terminal symmetrically connected to the first plate rectifier, the second plate rectifier, the third plate rectifier, and the fourth plate rectifier.

In some example output rectifiers, the first output terminal is connected to: a first electrical conductor connecting the first plate rectifier to the second plate rectifier; and a second electrical conductor connecting the third plate rectifier to the fourth plate rectifier.

In some example output rectifiers, each of the first plate rectifier, the second plate rectifier, the third plate rectifier, and the fourth plate rectifier includes a conductive plate, and the first electrical conductor is connected to the conductive plates of the first plate rectifier and the second plate rectifier, and the second electrical conductor is connected to the conductive plates of the third plate rectifier and the fourth plate rectifier.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As used herein, "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, the term "exemplary" means serving as a non-limiting example, instance, or illustration. As utilized herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating. As used herein, a welding-type power supply refers to any device capable of, when power is applied thereto, supplying suitable power for welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

FIG. 1 is a diagram of an example welding-type system 10 in accordance with aspects of this disclosure. The example welding-type system 10 is a GMAW (gas metal arc welding) system, and in particular a MIG welding system. However, the example system 10 may perform flux cored arc welding (FCAW) and/or other wire-fed weld processes. In the example of FIG. 1, the system 10 includes a power supply 12 configured to receive and convert input power to welding-type power, which is output to a wire feeder 14. The wire feeder delivers the power to a welding torch 16 to perform a welding operation.

The power supply 12 receives input power 18 from any suitable source, such as the power grid, an engine-generator set, hybrid power supplies, fuel cells, batteries, and/or any combination of these input power sources and/or other power sources. Power conversion circuitry 20 converts the input power 18 to welding-type power. The power supply 12 may be designed to carry out multiple different welding processes that can be selected by an operator, and the power conversion circuitry 20 includes components, such as solid state switches discussed below, that allow for power conversion in accordance with the desired process. Control circuitry 22 is coupled to the power conversion circuitry 20 and controls the operation of the power conversion circuitry during the selected process. For example, the control circuitry 22 may provide signals that regulate the conductive states of solid state switches within the power conversion circuitry to produce the desired output power, as also discussed below. In many applications the control and processing circuitry will include one or more digital processors or microprocessors with associated memory to store and carry out the processes available on the power supply. Such processes may include constant voltage (CV) processes, constant current (CC) processes, pulsed processes, cutting processes, and so forth. The processes and other welding parameters may be selected via an operator interface 24 that is coupled to the control circuitry 22. The power supply 12 may further include communications circuitry that allows for communications with remote or networked components and systems, illustrated as data/network interface 26 in FIG. 1. Such communications circuitry may allow for monitoring of welding operations, logging of weld data, downloading or configuration of new processes and updates to processes, and so forth. Finally, the power supply 12 will sometimes include removable memory 28 that may be used for storing processes, process parameters, system updates, and any suitable data.

The example system 10 includes a wire feeder 14 which may be separate from and/or integrated into the power supply 12 (e.g., contained within a housing of the power supply 12). In the illustrated example, power and/or data may be transferred from the power supply 12 to the wire feeder 14 via one or more cables or cable bundles 30. The wire feeder 14 includes drive control circuitry 32 that regulates the operation of a drive assembly 34. Drive control 32 along with control circuitry 22 together are the controller for system 10. The controller may include other control modules as well. The drive assembly 34 contacts and feeds a wire electrode 36 to the welding operation. The wire electrode is typically stored on a spool 38 within the wire feeder. The wire feeder may also include one or more gas valves for providing shielding gas for a welding operation. Finally, an operator interface 42 may allow certain parameters of the wire feeder to be selected, such as wire feed speed. The power supply 12 and wire feeder 14 may operate in coordination so that wire and gas resources are fed to the welding operation when power is provided for welding at the initiative of the welding operator (e.g., via a control on the torch 16).

The wire and gas resources are provided via a weld cable 44 coupled to the torch. A second or work cable 46 is typically clamped or coupled in some manner to a workpiece 48 for completing the electrical circuit. The full circuit is completed during the welding operation by an arc as indicated at reference numeral 50.

The example power conversion circuitry 20 includes an input rectifier 52 that converts AC power to DC power, a preregulator circuit 54 that receives the rectified input and provides a boosted bus to one or more converters 56. The converters 56 may include half-bridge converter circuits, full-bridge converter circuits, and/or any other switched mode power supply circuitry. The converter(s) 56 may be stacked and/or parallelized. The converter(s) 56 output high frequency AC power to isolation transformers 58, which provide a high frequency AC output to output rectifiers 60. As described in more detail below, the output rectifier(s) 60 may include plate rectifiers, and the number of plate rectifiers may be based on the number of converter(s) 56 and/or the number of transformers 58 in the power conversion circuitry 20. The wire feeder 14 feeds the wire at a rate set by the user, and the control circuitry 22 causes power conversion circuitry 20 to provide an output at the current necessary for that wire feed speed, and at the desired voltage.

Figure 2:
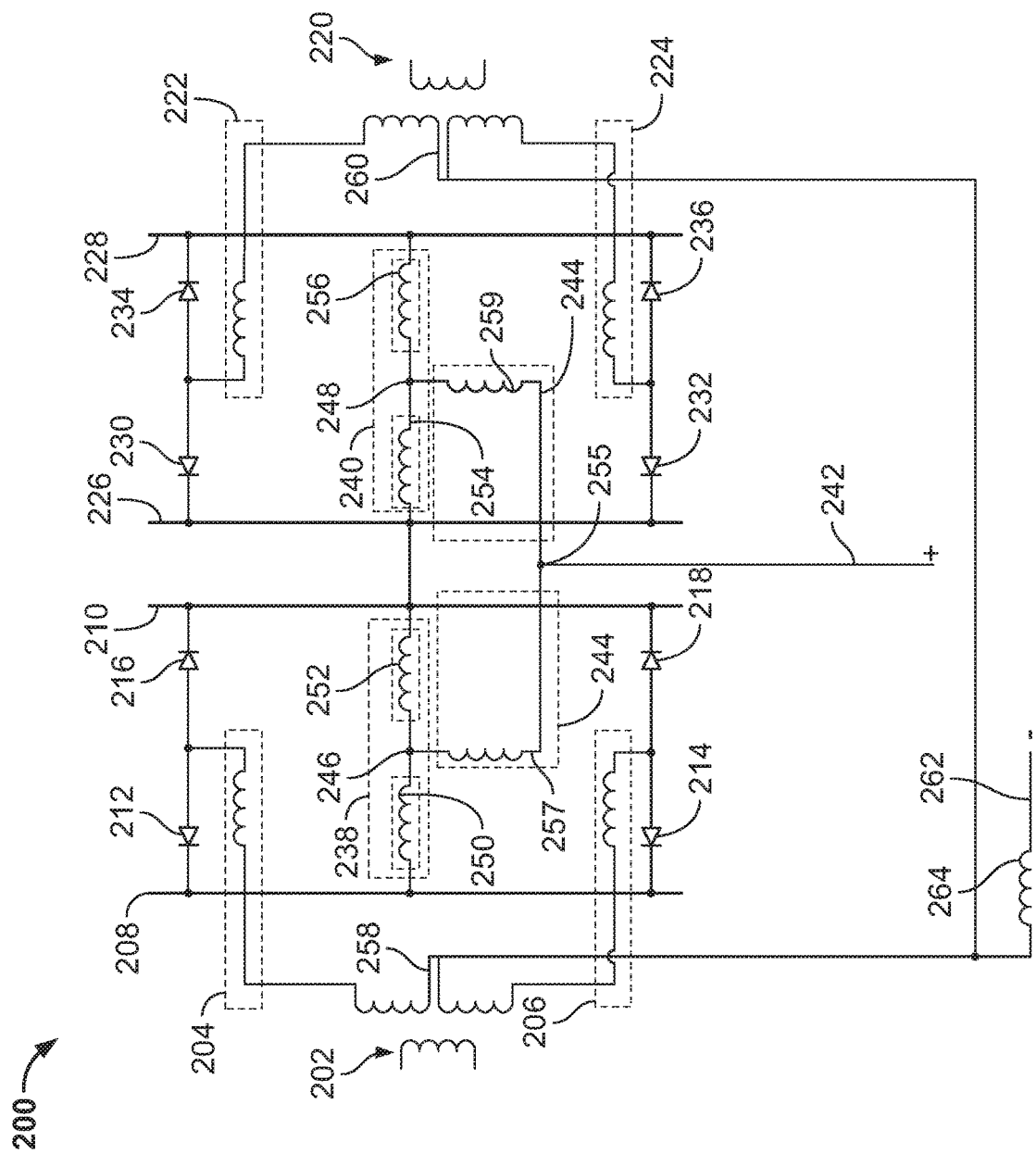
FIG. 2 is a schematic diagram of an example balanced plate rectifier, which may be used to implement the output rectifier to rectify the outputs of two transformers of the switched-mode power supply of FIG. 1.

FIG. 2 is a schematic diagram of an example balanced plate rectifier 200, which may be used to implement the output rectifier(s) 60 of FIG. 1 to rectify the outputs of two transformers 58 of the switched-mode power supply 56 of FIG. 1. The plate rectifier 200 receives an AC input current (e.g., high frequency AC input current) and outputs a DC output current (e.g., welding-type power) via positive and negative output terminals.

A first transformer 202 has a first output lead 204 and a second output lead 206. The first output lead 204 of the first transformer 202 is connected to a first plate rectifier 208 and a second plate rectifier 210. The second output lead 206 of the first transformer 202 is connected to the first plate rectifier 208 and the second plate rectifier 210. The first output lead 204 and the second output lead 206 each have a parasitic inductance. The first plate rectifier 208 is connected to the first output lead 204 via a diode 212 and the second output lead 206 via a diode 214. The second plate rectifier 210 is connected to the first output lead 204 via a diode 216 and the second output lead 206 via a diode 218.

The second transformer 220 has a first output lead 222 and a second output lead 224. The first output lead 222 of the second transformer 220 is connected to a third plate rectifier 226 and a fourth plate rectifier 228. The second output lead 224 of the second transformer 220 is connected to the third plate rectifier 226 and the fourth plate rectifier 228. The first output lead 222 and the second output lead 224 each have a parasitic inductance. The third plate rectifier 226 is connected to the first output 222 lead via a diode 230 and the second output lead 224 via a diode 232. The fourth plate rectifier 228 is connected to the first output lead 222 via a diode 234 and the second output lead 224 via a diode 236.

Each diode 212, 214, 216, 218, 230, 232, 234, and 236 has an anode connected to the respective output lead 204, 206, 222, or 224 and a cathode common to the respective plate 208, 210, 226, or 228. In some examples, the diodes 212, 214, 216, 218, 230, 232, 234, and 236 may be pressed into the plates. Each diode 212, 214, 216, 218, 230, 232, 234, and 236 of FIG. 2 may represent multiple diodes, for example, in parallel, in series, or in a parallel and series combination.

The first plate rectifier 208 and the second plate rectifier 210 are connected to each other via one or more electrical conductors 238 (e.g., an aluminum bolt) and the third plate rectifier 226 and the fourth plate rectifier 228 are also connected to each other via one or more electrical conductors 240. Each electrical conductor 238 and 240 is connected to an output terminal 242 via an electrical conductor 244. The electrical conductor 244 is connected to the electrical conductor 238 at a point 246 symmetrically between the first plate rectifier 208 and the second plate rectifier 210. The electrical conductor 244 is connected to the electrical conductor 240 at a point 248 symmetrically between the third plate rectifier 226 and the fourth plate rectifier 228. Accordingly, the electrical conductor 238 will have a parasitic inductance 250 between the first plate rectifier 208 and the connection point 246 and a parasitic inductance 252 between the second plate rectifier 210 and the connection point 246. The parasitic inductance 250 and 252 are substantially equal when the electrical conductor 244 is connected at the symmetrical connection point 246. Similarly, the electrical conductor 240 will have a parasitic inductance 254 between the third plate rectifier 226 and the connection point 248 and a parasitic inductance 256 between the fourth plate rectifier 228 and the connection point 248. The parasitic inductances 254 and 256 are substantially equal when the electrical conductor 244 is connected at the symmetrical connection point 248.

The electrical conductor 244 is connected to the output terminal 242 at a connection point 255 which is symmetrical between the connection point 246 and the connection point 248. The parasitic inductance 257 of the electrical inductor 244 between the connection point 246 and the connection point 255 is substantially equal to the parasitic inductance 259 of the electrical conductor 244 between the connection point 248 and the connection point 255. Accordingly, the output terminal 242 is symmetrically connected to each plate rectifier 208, 210, 226, and 228 when the connection points 246 and 248 are symmetrical. As such, the impedance between each plate rectifier 208, 210, 226, and 228 and the output terminal 242 is substantially equal.

The first transformer 202 is a center tapped transformer having a center tap output lead 258. The second transformer 220 is also a center tapped transformer having a center tap output lead 260. The center tap output leads 258 and 260 are connected via an electrical conductor and provide a second output terminal 262. Accordingly, DC welding-type power may be supplied between the first output terminal 242 and the second output terminal 262. In some examples, the electrical conductor connecting the center tap output leads 258 and 260 is connected to the output terminal 262 through an output inductor 264. As the cathodes of the diodes 212, 214, 216, 218, 230, 232, 234, and 236 are common to the plates 208, 210, 226, and 228, the first output terminal 242 has a positive polarity with respect to the second output terminal 262.

Figure 3:
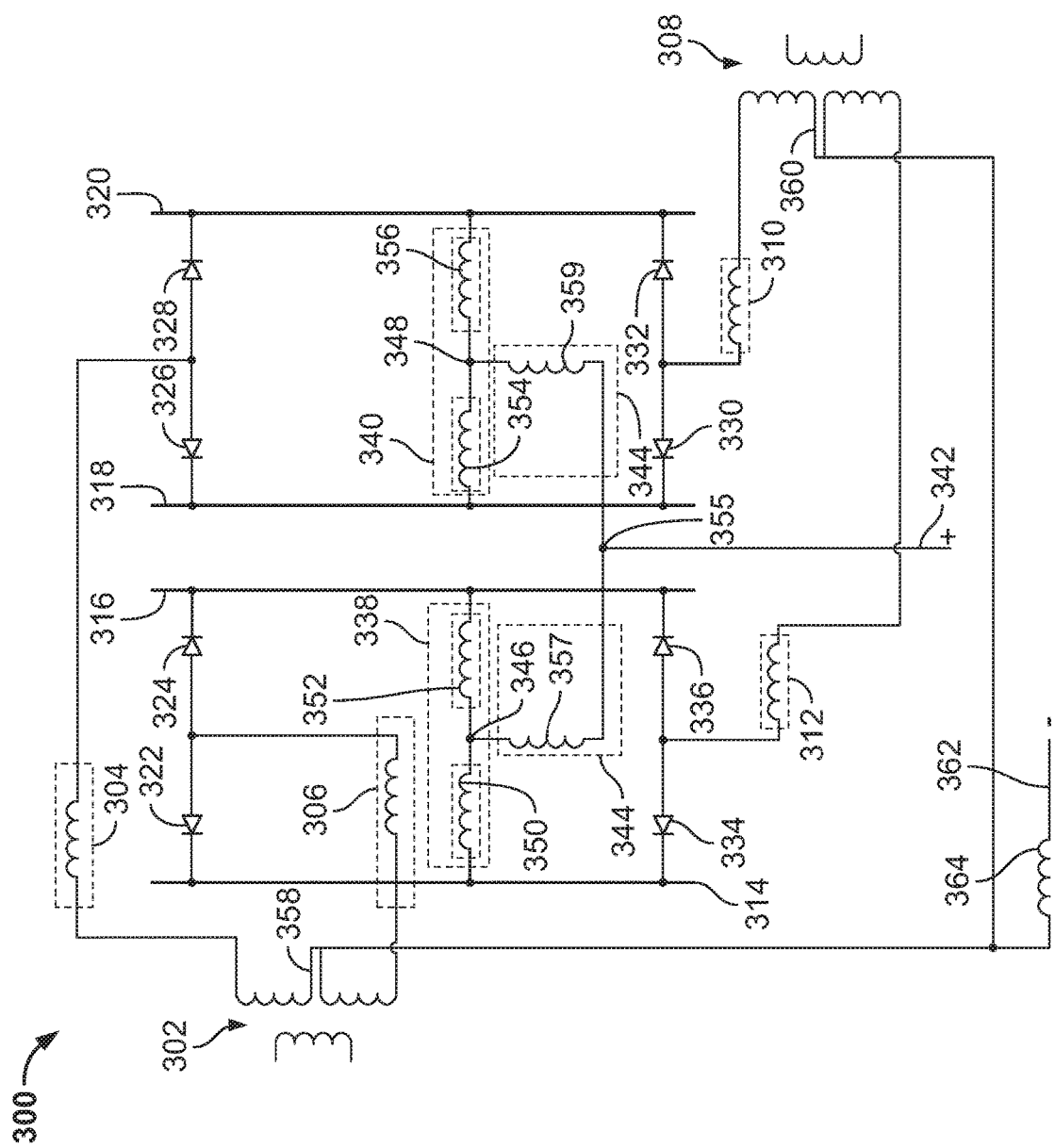
FIG. 3 is a schematic diagram of another example balanced plate rectifier, which may be used to implement the output rectifier to rectify the outputs of two transformers of the switched-mode power supply of FIG. 1.

FIG. 3 is a schematic diagram of another example balanced plate rectifier 300, which may be used to implement the output rectifier(s) 60 of FIG. 1 to rectify the outputs of two transformers 58 of the switched-mode power supply 56 of FIG. 1. While each of the transformers 202, 220 of the plate rectifier 200 of FIG. 2 were coupled to each of the plate rectifiers 208, 210, 226, 228, in the example plate rectifier 300 of FIG. 3, the transformers are coupled to different subsets of plate rectifiers.

A first transformer 302 has a first output lead 304 and a second output lead 306. A second transformer 308 has a first output lead 310 and a second output lead 312. The second output lead 306 of the first transformer 302 is connected to a first plate rectifier 314 and a second plate rectifier 316. The first output lead 304 of the first transformer 302 is connected to the third plate rectifier 318 and the fourth plate rectifier 320. The first output lead 304 and the second output lead 306 each have a parasitic inductance. The first plate rectifier 314 is connected to the second output lead 306 via a diode 322. The second plate rectifier 316 is connected to the second output lead 306 via a diode 324. The third plate rectifier 318 is connected to the first output lead 304 via a diode 326. The fourth plate rectifier 320 is connected to the first output lead 304 via a diode 328.

The first output lead 310 of the second transformer 308 is connected to the third plate rectifier 318 and the fourth plate rectifier 320. The second output lead 312 of the second transformer 308 is connected to the first plate rectifier 314 and the second plate rectifier 316. The first output lead 310 and the second output lead 312 each have a parasitic inductance. The first output lead 310 is connected to the third plate rectifier 318 via a diode 330. The first output lead 310 is connected to the fourth plate rectifier 320 via a diode 332. The second output lead 312 is connected to the first plate rectifier 314 via a diode 334. The second output lead 312 is connected to the second plate rectifier 316 via a diode 336.

Each diode 322, 324, 326, 328, 330, 332, 334, and 336 has an anode connected to the respective output lead 304, 206, 310, or 312 and a cathode common to the respective plate 314, 316, 318, or 320. In some examples, the diodes 322, 324, 326, 328, 330, 332, 334, and 336 may be pressed into the plates. Each diode 322, 324, 326, 328, 330, 332, 334, and 336 of FIG. 3 may represent multiple diodes, for example, in parallel or in series, or a parallel series combination.

The first plate rectifier 314 and the second plate rectifier 316 are connected to each other via one or more electrical conductors 338 (e.g., an aluminum bolt) and the third plate rectifier 318 and the fourth plate rectifier 320 are also connected to each other via an electrical conductor 340. Each electrical conductor 338 and 340 is connected to an output terminal 342 via an electrical conductor 344. The electrical conductor 344 is connected to the electrical conductor 338 at a point 346 symmetrically between plate the first plate rectifier 314 and the second plate rectifier 316. The electrical conductor 344 is connected to the electrical conductor 340 at a point 348 symmetrically between the third plate rectifier 318 and the fourth plate rectifier 320. Accordingly, the electrical conductor 338 will have a parasitic inductance 350 between the first plate rectifier 314 and the connection point 346 and a parasitic inductance 352 between the second plate rectifier 316 and the connection point 346. The parasitic inductance 350 and 352 are substantially equal when the electrical conductor 344 is connected at the symmetrical connection point 346. Similarly, the electrical conductor 340 has a parasitic inductance 354 between the third plate rectifier 318 and the connection point 348 and a parasitic inductance 356 between the fourth plate rectifier 320 and the connection point 348. The parasitic inductances 354 and 356 are substantially equal when the electrical conductor 344 is connected at the symmetrical connection point 348.

The electrical conductor 344 is connected to the output terminal 342 at a connection point 355 which is symmetrical between the connection point 346 and the connection point 348. The parasitic inductance 357 of the electrical conductor 344 between the connection point 346 and the connection point 355 is substantially equal to the parasitic inductance 359 of the electrical conductor 344 between the connection point 348 and the connection point 355. Accordingly, the output terminal 342 is symmetrically connected to each plate rectifier 314, 316, 318, and 320 when the connection points 346 and 348 are symmetrical. As such, the impedance between each plate rectifier 314, 316, 318, and 320 and the output terminal 342 is substantially equal.

The first transformer 302 is a center tapped transformer having a center tap output lead 358. The second transformer 308 is also a center tapped transformer having a center tap output lead 360. The center tap output leads 358 and 360 are connected via an electrical conductor and provide a second output terminal 362. Accordingly, DC welding-type power may be supplied between the first output terminal 342 and the second output terminal 362. In some examples, the electrical conductor connecting the center tap output leads 358 and 360 is connected to the output terminal 362 through an output inductor 364. As the cathodes of the diodes 322, 324, 326, 328, 330, 332, 334, and 336 are common to the plates 314, 316, 318, and 320, the first output terminal 342 has a positive polarity with respect to the second output terminal 362.

While the example plate rectifiers 200, 300 of FIGS. 2 and 3 are shown with four plate rectifiers and two transformers each, additional plate rectifiers and/or additional transformers may be used to improve capacity and/or load balancing.

Figure 4:
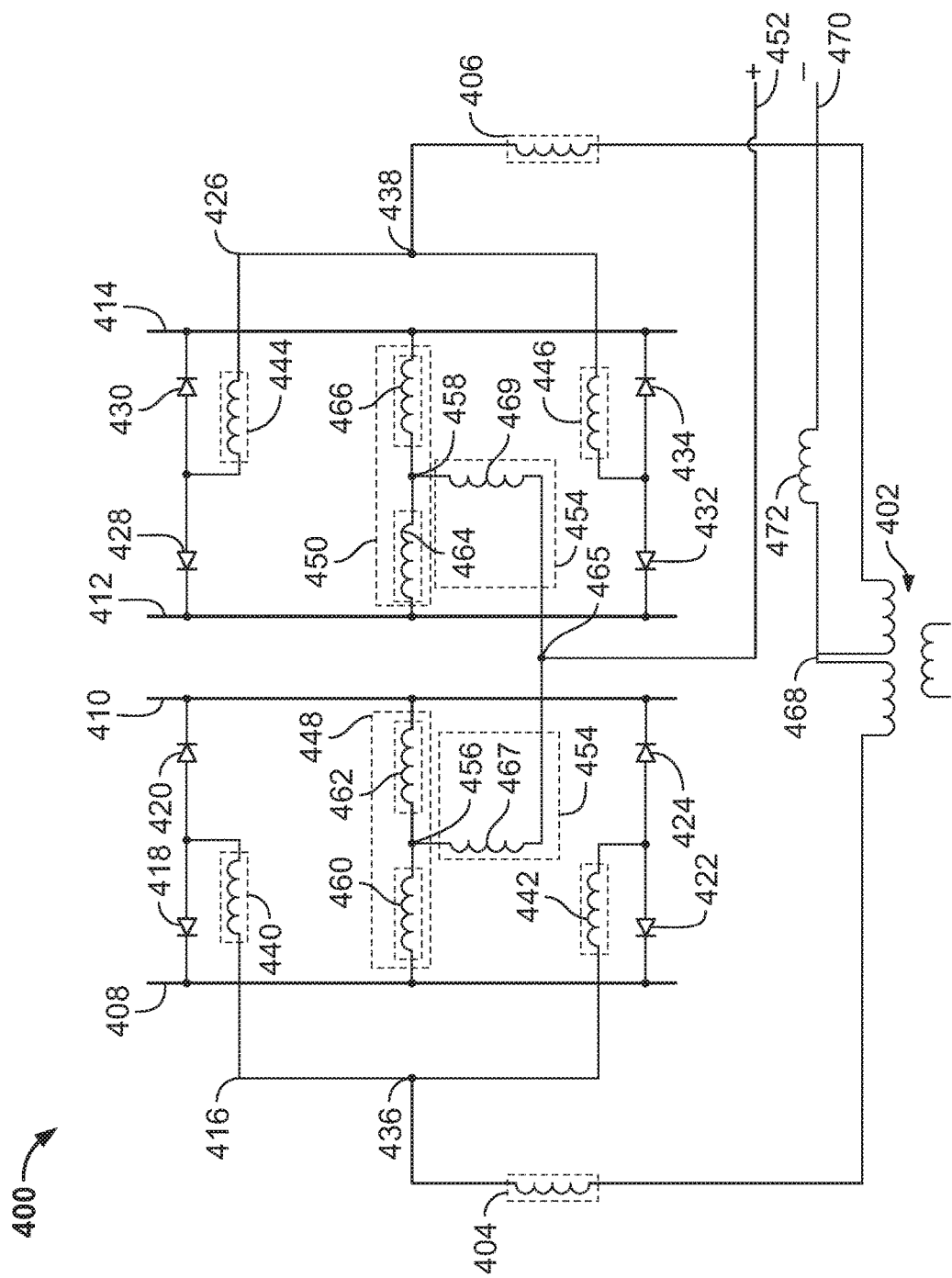
FIG. 4 is a schematic diagram of an example balanced plate rectifier, which may be used to implement the output rectifier to rectify the outputs of a single transformer of the switched-mode power supply of FIG. 1.

FIG. 4 is a schematic diagram of an example balanced plate rectifier 400, which may be used to implement the output rectifier(s) 60 to rectify the outputs of a single transformer of the switched-mode power supply 56 of FIG. 1.

The transformer 402 has a first output lead 404 and a second output lead 406. The first output lead 404 is connected to a first plate rectifier 408 and a second plate rectifier 410. The second output lead 406 is connected to a third plate rectifier 412 and a fourth plate rectifier 414. An electrical conductor 416 connects the first output lead 404 to the first plate rectifier 408 and the second plate rectifier 410 via diodes 418, 420, 422, and 424. An electrical conductor 426 connects the second output lead 406 to the third plate rectifier 412 and the fourth plate rectifier 414 via diodes 428, 430, 432, and 434. The conductor 416 is connected to the anodes of diodes 418, 420, 422, and 424. The conductor 426 is connected to the anodes of diodes 428, 430, 432, and 434. The cathodes of diodes 418 and 422 are common to the first plate 408, the cathodes of diodes 420 and 424 are common to the second plate 410, the cathodes of diodes 428 and 432 are common to the third plate 412, and the cathodes of diodes 430 and 434 are common to the fourth plate 414. In some examples, the cathodes of the diodes 418, 420, 422, 424, 428, 430, 432, and 434 may be pressed into the plates 408, 410, 412, and 414.

The conductor 416 is connected to the first output lead 404 at connection point 436. The conductor 426 is connected to the second output lead 406 at connection point 438. The conductor 416 has a parasitic inductance 440 between the connection point 436 and the anodes of the diodes 418 and 420. The conductor 416 has a parasitic inductance 442 between the connection point 436 and the anodes of the diodes 422 and 424. The connection point 436 is placed on the conductor 416 such that the parasitic inductance 440 is substantially equal to the parasitic inductance 442. The conductor 426 has a parasitic inductance 444 between the connection point 438 and the anodes of the diodes 428 and 430. The conductor 426 has a parasitic inductance 446 between the connection point 438 and the anodes of the diodes 432 and 434. The connection point 438 is placed on the conductor 426 such that the parasitic inductance 444 is substantially equal to the parasitic inductance 446.

The first plate rectifier 408 and the second plate rectifier 410 are connected to each other via one or more electrical conductors 448 (e.g., an aluminum bolt) and the third plate rectifier 412 and the fourth plate rectifier 414 are also connected to each other via one or more electrical conductors 450. Each electrical conductor 448 and 450 is connected to an output terminal 452 via an electrical conductor 454. The electrical conductor 454 is connected to the electrical conductor 448 at a point 456 symmetrically between plate the first plate rectifier 408 and the second plate rectifier 410. The electrical conductor 454 is connected to the electrical conductor 450 at a point 458 symmetrically between the third plate rectifier 412 and the fourth plate rectifier 414. Accordingly, the electrical conductor 448 will have a parasitic inductance 460 between the first plate rectifier 408 and the connection point 456 and a parasitic inductance 462 between the second plate rectifier 410 and the connection point 456. The parasitic inductance 460 and 462 are substantially equal when the electrical conductor 454 is connected at the symmetrical connection point 456. Similarly, the electrical conductor 450 will have a parasitic inductance 464 between the third plate rectifier 412 and the connection point 458 and a parasitic inductance 466 between the fourth plate rectifier 414 and the connection point 458. The parasitic inductances 464 and 466 are substantially equal when the electrical conductor 454 is connected at the symmetrical connection point 458.

The electrical conductor 454 is connected to the output terminal 452 at a connection point 465 which is symmetrical between the connection point 456 and the connection point 458. The parasitic inductance 467 of the electrical conductor 454 between the connection point 456 and the connection point 465 is substantially equal to the parasitic inductance 469 of the electrical conductor 454 between the connection point 458 and the connection point 465. Accordingly, the output terminal 452 is symmetrically connected to each plate rectifier 408, 410, 412, and 414 when the connection points 456 and 458 are symmetrical. As such, the impedance between each plate rectifier 408, 410, 412, and 414 and the output terminal 452 is substantially equal.

The transformer 402 is a center tapped transformer having a center tap output lead 468. The center tap output lead 468 provides a second output terminal 470. Accordingly, DC welding-type power may be supplied between the first output terminal 452 and the second output terminal 470. In some examples, the center tap output lead 468 is connected to the output terminal 470 through an output inductor 472. As the cathodes of the diodes 418, 420, 422, 424, 428, 430, 432, and 434 are common to the plates 408, 410, 412, and 414, the first output terminal 452 has a positive polarity with respect to the second output terminal 470.

Figure 5:
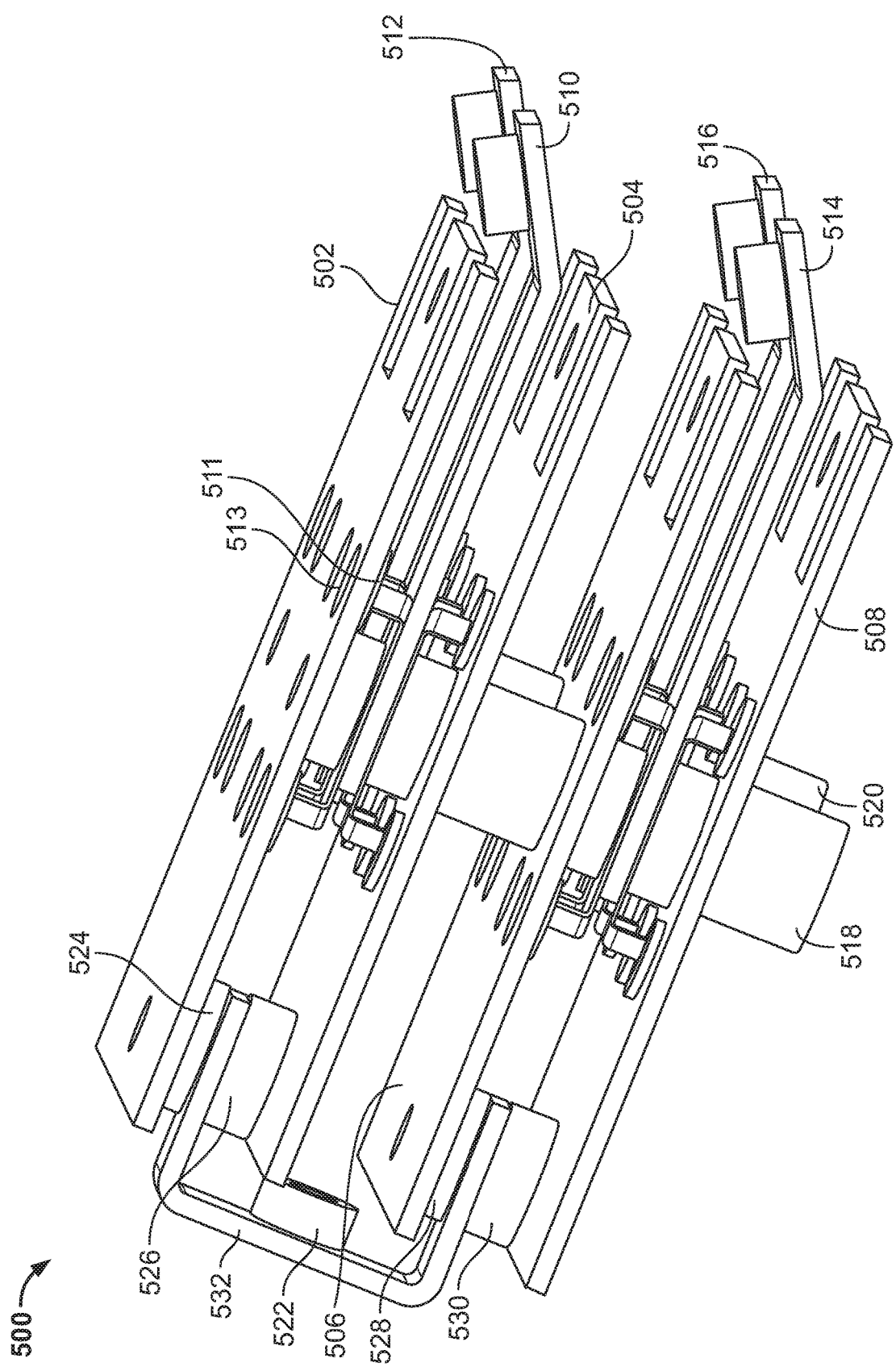
FIG. 5 is a perspective view of an example implementation of the balanced plate rectifier of FIG. 2.
Figure 6:
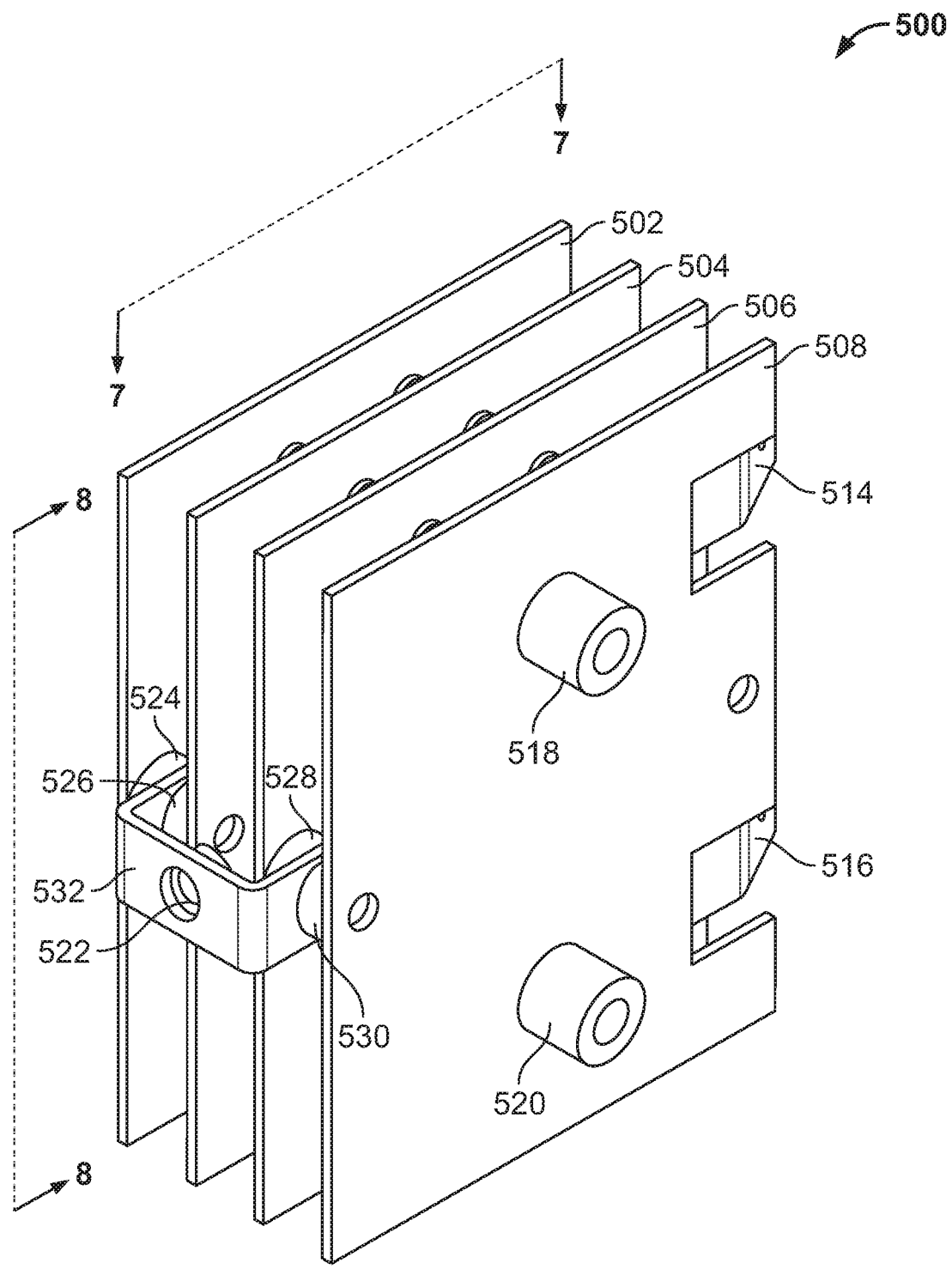
FIG. 6 is another perspective view of the balanced plate rectifier of FIG. 5.
Figure 7:
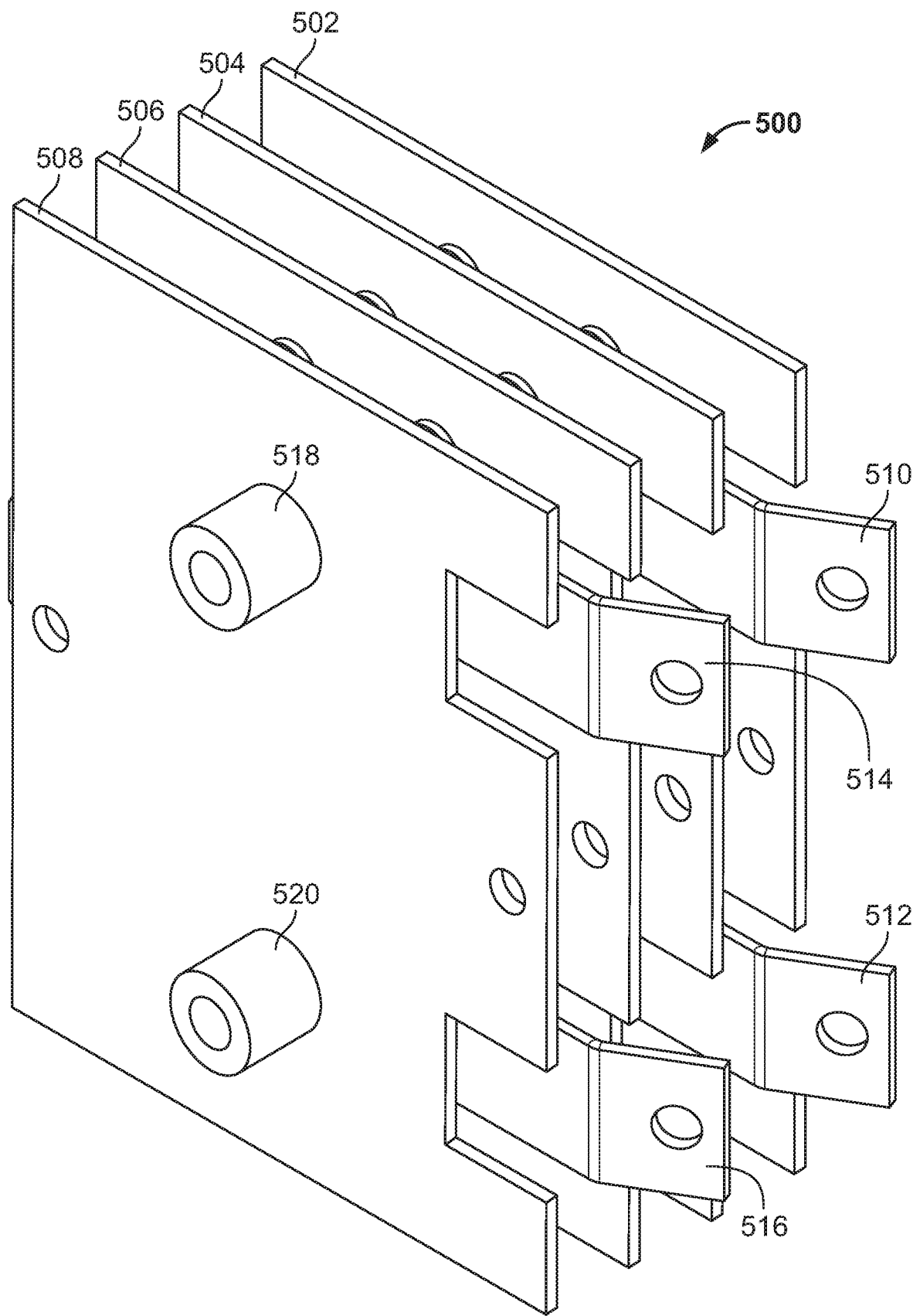
FIG. 7 is another perspective view of the balanced plate rectifier of FIG. 5.

FIG. 5 is a perspective view of an example implementation of a balanced plate rectifier 500, for example the balanced plate rectifier 200 of FIG. 2. FIG. 6 is another perspective view of the balanced plate rectifier 500 of FIG. 5. FIG. 7 is another perspective view of the balanced plate rectifier 500 of FIG. 5. FIG. 8 is another elevation view of the balanced plate rectifier 500 of FIG. 5. The balanced plate rectifier 500 of FIG. 5 may also be used to implement the balanced plate rectifiers of FIGS. 3 and 4 by altering the connections between transformers and the balanced plate rectifier 500.

The balanced plate rectifier 500 includes plates 502, 504, 506, and 508 (which may correspond, for example to plates 208. 210, 226 and 228 of FIG. 2.) The example plates 502-508 are aluminum plates and/or aluminum alloy, or the plates 502-508 may be made of some other suitable conductor such as copper or copper alloy. The balanced plate rectifier 500 includes input terminals 510, 512, 514, and 516, which may connect to output leads of one or more transformers, for example output leads 204, 206, 222, and 224 of FIG. 2. The input terminals 510, 512, 514, and 516 may connect to the transformer leads via threaded insert nuts. The input terminals 510, 512, 514, and 516 each have a parasitic inductance at high frequencies, which is represented by the inductors in references 204, 206, 222, and 224 of FIG. 2. The input terminals 510 and 512 connect to the plates 502 and 504 via diodes which have cathodes common to the plates 502 and 504. For example, the input terminal 510 may connect to the anode of one or more diodes having a cathode connected to the first plate 502 and the input terminal 510 may connect to the anode of one or more diodes having a cathode connected to the second plate 504. The input terminal 512 may connect to the anode of one or more diodes having a cathode connected to the first plate 502 and the input terminal 512 may connect to the anode of one or more diodes having a cathode connected to the second plate 504. Similarly, the input terminals 514 and 516 connect to the plates 506 and 508 via diodes which have cathodes common to the plates 506 and 508. For example, as illustrated, input terminal 510 is connected to the anode 511 of a diode, which has a cathode 513 connected the first plate 502. Mechanical structures 518 and 520 are insulating and hold the plates 502, 504, 506, and 508 in place.

The output terminal 522 provides rectified DC power. The output terminal 522 may be a threaded insert nut. The output terminal is symmetrically connected to each plate 502, 504, 506, and 508. Each plate is connected to a conductor (plate 502 is connected to conductor 524, plate 504 is connected to conductor 526, plate 506 is connected to conductor 528, and plate 508 is connected to conductor 530.) The conductors 524, 526, 528, and 530, may each be an aluminum bolt. At high frequencies, the conductors 524, 526, 528, and 530 have parasitic inductances, which are represented, for example in FIG. 2 as the inductors in reference numbers 250, 252, 254, and 256. A conductor 532 connects the output terminal 522 to each conductor 524, 526, 528, and 530. The output terminal 522 is placed on the conductor 532 symmetrically between the conductors 524, 526, 528, and 530, such that the parasitic inductance of the conductor 532 is balanced between the output terminal 522 and the conductors 524, 526, 528, and 530 (see parasitic inductances 257 and 259 of FIG. 2.)

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application-specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general-purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply comprising:
    power conversion circuitry configured to convert input power to welding-type power, the power conversion circuitry comprising:
        a first transformer configured to output first alternating current (AC) power;
        a second transformer configured to output second alternating current (AC) power; and
        a rectifier configured to convert the first AC power and the second AC power to direct current (DC) output power, the rectifier comprising:
            a first plate rectifier connected to a first output lead of the first transformer and a second output lead of the first transformer;
            a second plate rectifier connected to the first output lead and the second output lead;
            a third plate rectifier connected to a third output lead of the second transformer and a fourth output lead of the second transformer;
            a fourth plate rectifier connected to the third output lead of the second transformer and the fourth output lead of the second transformer; and
            a first output terminal symmetrically connected to the first plate rectifier, the second plate rectifier, the third plate rectifier, and the fourth plate rectifier.

2. The welding-type power supply of claim 1, wherein the first output terminal is connected to:
    a first electrical conductor connecting the first plate rectifier to the second plate rectifier; and
    a second electrical conductor connecting the third plate rectifier to the fourth plate rectifier.

3. The welding-type power supply of claim 2, wherein each of the first plate rectifier, the second plate rectifier, the third plate rectifier, and the fourth plate rectifier comprises a conductive plate, and wherein the first electrical conductor is connected to the conductive plates of the first plate rectifier and the second plate rectifier, and wherein the second electrical conductor is connected to the conductive plates of the third plate rectifier and the fourth plate rectifier.

4. The welding-type power supply of claim 3, wherein each of the first plate rectifier, the second plate rectifier, the third plate rectifier, and the fourth plate rectifier comprises a pair of diodes, each of the diodes having:
    an anode connected to the respective first output lead, second output lead, third output lead, or fourth output lead; and
    a cathode connected to the respective conductive plate.

5. The welding-type power supply of claim 3, wherein each of the conductive plates are aluminum alloy plates.

6. The welding-type power supply of claim 1, wherein the power conversion circuitry further comprises a second output terminal connected to a first center tap lead of the first transformer and a second center tap lead of the second transformer.

7. The welding-type power supply of claim 6, wherein the power conversion circuitry is configured to provide direct current welding-type power between the first output terminal and the second output terminal.

8. The welding-type power supply of claim 7, wherein the first output terminal has a positive polarity.

9. The welding-type power supply of claim 1, wherein the first output lead and the second output lead are symmetrically connected to the first plate rectifier and the second plate rectifier, and wherein the third output lead and the fourth output lead are symmetrically connected to the third plate rectifier and the fourth plate rectifier.

10. A welding-type power supply comprising:
power conversion circuitry configured to convert input power to welding-type power, the power conversion circuitry comprising:
a first transformer having a first output lead and a second output lead, the first transformer configured to output first alternating current (AC) power;
a second transformer having a third output lead and a fourth output lead, the second transformer configured to output second alternating current (AC) power; and
a rectifier configured to convert the first AC power and the second AC power to direct current (DC) output power, the rectifier comprising:
a first plate rectifier connected to the second output lead of the first transformer and the fourth output lead of the second transformer;
a second plate rectifier connected to the second output lead of the first transformer and the fourth output lead of the second transformer;
a third plate rectifier connected to the first output lead of the first transformer and the third output lead of the second transformer;
a fourth plate rectifier connected to the first output lead of the first transformer and the third output lead of the second transformer; and
a first output terminal symmetrically connected to the first plate rectifier, the second plate rectifier, the third plate rectifier, and the fourth plate rectifier.

11. The welding-type power supply of claim 10, wherein the first output terminal is connected to:
a first electrical conductor connecting the first plate rectifier to the second plate rectifier; and
a second electrical conductor connecting the third plate rectifier to the fourth plate rectifier.

12. The welding-type power supply of claim 11, wherein each of the first plate rectifier, the second plate rectifier, the third plate rectifier, and the fourth plate rectifier comprises a conductive plate, and wherein the first electrical conductor is connected to the conductive plates of the first plate rectifier and the second plate rectifier, and wherein the second electrical conductor is connected to the conductive plates of the third plate rectifier and the fourth plate rectifier.

13. The welding-type power supply of claim 12, wherein each of the first plate rectifier, the second plate rectifier, the third plate rectifier, and the fourth plate rectifier comprises a pair of diodes, each of the diodes having:
an anode connected to the respective first output lead, second output lead, third output lead, or fourth output lead; and
a cathode connected to the respective conductive plate.

14. The welding-type power supply of claim 13, wherein each of the conductive plates are aluminum alloy plates.

15. The welding-type power supply of claim 10, wherein the power conversion circuitry further comprises a second output terminal connected to a first center tap lead of the first transformer and a second center tap lead of the second transformer.

16. The welding-type power supply of claim 15, wherein the power conversion circuitry is configured to provide direct current welding-type power between the first output terminal and the second output terminal.

17. The welding-type power supply of claim 16, wherein the first output terminal has a positive polarity.

18. The welding-type power supply of claim 10, wherein the second output lead and the fourth output lead are symmetrically connected to the first plate rectifier and the second plate rectifier, and wherein the first output lead and the third output lead are symmetrically connected to the third plate rectifier and the fourth plate rectifier.

19. A welding-type power supply comprising:
power conversion circuitry configured to convert input power to welding-type power, the power conversion circuitry comprising:
a first transformer configured to output first alternating current (AC) power; and
a rectifier configured to convert the first AC power to direct current (DC) output power, the rectifier comprising:
a first plate rectifier connected to a first output lead of the first transformer;
a second plate rectifier connected to the first output lead;
a third plate rectifier connected to a second output lead;
a fourth plate rectifier connected to the second output lead; and
a first output terminal symmetrically connected to the first plate rectifier, the second plate rectifier, the third plate rectifier, and the fourth plate rectifier.

20. The welding-type power supply of claim 19, wherein the first plate rectifier, the second plate rectifier, the third plate rectifier, and the fourth plate rectifier are symmetrically connected to the first output lead and the second output lead.

* * * * *